(12) United States Patent
Ballegeer et al.

(10) Patent No.: US 10,489,431 B2
(45) Date of Patent: Nov. 26, 2019

(54) DIGITAL LOCATION-BASED DATA METHODS AND PRODUCT

(71) Applicant: TomTom Belgium N.V., Ghent (BE)

(72) Inventors: Filip Ballegeer, Bruges (BE); Gaëtan Martens, Zarlardinge (BE)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 844 days.

(21) Appl. No.: 14/388,286

(22) PCT Filed: Mar. 27, 2013

(86) PCT No.: PCT/EP2013/056497
§ 371 (c)(1),
(2) Date: Sep. 26, 2014

(87) PCT Pub. No.: WO2013/144192
PCT Pub. Date: Oct. 3, 2013

(65) Prior Publication Data
US 2015/0213055 A1   Jul. 30, 2015

(30) Foreign Application Priority Data
Mar. 27, 2012   (GB) .................................. 1205348.4

(51) Int. Cl.
*G06F 16/29* (2019.01)
*G06F 16/28* (2019.01)
(Continued)

(52) U.S. Cl.
CPC .............. *G06F 16/29* (2019.01); *G01C 21/32* (2013.01); *G06F 16/285* (2019.01); *G06F 16/9535* (2019.01); *G08G 1/0129* (2013.01)

(58) Field of Classification Search
CPC ......... G06F 17/30241; G06F 17/30598; G06F 17/30867; G08G 1/0129
See application file for complete search history.

(56) References Cited

U.S. PATENT DOCUMENTS

| 5,402,117 | A | 3/1995 | Zijderhand |
| 6,285,995 | B1 * | 9/2001 | Abdel-Mottaleb ......................... G06F 17/3025 707/737 |

(Continued)

FOREIGN PATENT DOCUMENTS

| CN | 1550756 A | 12/2004 |
| CN | 1643519 A | 7/2005 |

(Continued)

OTHER PUBLICATIONS

Eisenman et al: "Using probe data to estimate 00 matrices" published 2004 by IEEE; "Proceedings of 7th International IEEE Conference on Intelligent Transportation Systems". pp. 291-296.

(Continued)

*Primary Examiner* — Giuseppi Giuliani (57) ABSTRACT

The invention relates to a method of obtaining and storing data relating to a count of journeys made between origin and destination pairs in respect of different predetermined time periods. Positional data is received from vehicles, and filtered to obtain positional data relating to travel between each of a plurality of origin-destination pairs. The filtered positional data is analysed to obtain multiple sets of profiles. Each set of profiles represents a count of journeys made between the origin and destination in a plurality of predetermined time periods for each origin-destination pair. The different sets of profiles relate to different days of the week, and journeys having arrival or departure times in the predetermined time periods. The sets of profiles are used in a clustering operation to provide a reduced set of standard profiles. Location information identifying each origin-destination pair is stored in association with data representing the or each standard profile which can be taken to represent (Continued)

the one or more profiles in respect of the origin-destination pair.

13 Claims, 4 Drawing Sheets

(51) Int. Cl.
  *G06F 16/9535* (2019.01)
  *G01C 21/32* (2006.01)
  *G08G 1/01* (2006.01)

(56) References Cited

U.S. PATENT DOCUMENTS

| | | | |
|---|---|---|---|
| 7,266,443 B2 | 9/2007 | Hirose | |
| 2002/0198694 A1 | 12/2002 | Yang et al. | |
| 2006/0293046 A1 | 12/2006 | Smith | |
| 2009/0043486 A1* | 2/2009 | Yang | G01C 21/3492 701/117 |
| 2010/0299055 A1 | 11/2010 | Hilbrandie | |
| 2010/0312472 A1 | 12/2010 | Hilbrandie et al. | |
| 2013/0035089 A1* | 2/2013 | Moritz | H04W 64/00 455/422.1 |

FOREIGN PATENT DOCUMENTS

| | | |
|---|---|---|
| CN | 101783069 A | 7/2010 |
| CN | 102394008 A | 3/2012 |
| DE | 10 2008 017568 A1 | 4/2009 |
| EP | 1503355 A | 2/2005 |
| KR | 101304567 B1 | 3/2013 |
| WO | 2009053411 A1 | 4/2009 |

OTHER PUBLICATIONS

Albrecht et al—"Application of origin-destination matrices to the design of train services"; Australasian Journal of Engineering Education, vol. 15 No. 2, p. 95-104.

Hazelton et al—"Estimation of origin-destination trip matrices from link counts".

Ferguson et al—"Origin-destination weighting in agent modelling for pedestrian movement forecasting"; Proceedings: Eighth International Space Syntax Symposium; Santiago de Chile: PUC, 2012.

International Search Report dated Jun. 6, 2013 for International Application No. PCT/EP2013/056497.

XP011385665, Francesco Calabrese et al: "Estimating Origin-Destination Flows Using Mobile Phone Location Data"; IEEE Pervasive Computi ng, IEEE Service Center, Los Alamitos, CA, US, ISSN: 1536-1268, DOI: 10.1109/MPRV.2011.41.

Search Report dated Jul. 13, 2012 for Uniteed Kingdom Application No. 1205348.4.

Liu Miao, et al., "Investigation of Residents' Trip in View of Mobile Phone Information", Urban Roads Bridges & Flood Control, Mar. 31, 2007.

Huang Mei-ling, et al., "Traffic DD Data Collection Technology Based on Mobile Phone Location", Journal of Chongqing Jiaotong University(Natural Sciences), 2010, 29(1), Feb. 28, 2010.

* cited by examiner

|   D  O   | D1    | D2    | ...   | Dm    |
|----------|-------|-------|-------|-------|
| O1       | C(1,1)| C(1,2)| ...   | C(1,m)|
| O2       | C(2,1)| C(2,2)| ...   | C(2,m)|
| ...      |       |       | ...   |       |
| On       | C(n,1)| C(n,2)| ...   | C(n,m)|

$C$ = origin-destination matrix
$C(i,j)$ = number of traces from origin $i$ to destination $j$

| D O | D1 | ... | Dm |
|---|---|---|---|
| O1 | C(1,1)<br>*Mon:* OProfileType,DProfileType<br>*Tue:* OProfileType,DProfileType<br>...<br>*Sun:* OProfileType,DProfileType | ... | C(1,m)<br>*Mon:* OProfileType,DProfileType<br>*Tue:* OProfileType,DProfileType<br>...<br>*Sun:* OProfileType,DProfileType |
| ... | | ... | |
| On | C(n,1)<br>*Mon:* OProfileType,DProfileType<br>*Tue:* OProfileType,DProfileType<br>...<br>*Sun:* OProfileType,DProfileType | ... | C(n,m)<br>*Mon:* OProfileType,DProfileType<br>*Tue:* OProfileType,DProfileType<br>...<br>*Sun:* OProfileType,DProfileType |

OProfileType: Typical departure of trip time profile
DProfileType: Typical arrival of trip time profile

Figure 4

| | Brussels | Antwerp | Gent | Bruges |
|---|---|---|---|---|
| Brussels | 495323<br>Mon: 25,24<br>...<br>Sun: 3, 5 | 691321<br>Mon: 15,64<br>... | 493214<br>Mon: 61,12<br>... | 293531<br>Mon: 11,63<br>... |
| Antwerp | 736912<br>Mon: 12,64<br>...<br>Sun: 4,2 | 351251<br>Mon: 21,27<br>... | 605253<br>Mon: 15,27<br>... | 385421<br>Mon: 25,29<br>... |
| Gent | 563120<br>Mon: 11,64<br>... | 456287<br>Mon: 17,29<br>... | 214531<br>Mon: 25,25<br>... | 295124<br>Mon: 24,25<br>... |
| Bruges | 301584<br>Mon: 10,64<br>... | 297851<br>Mon: 18,31<br>... | 197512<br>Mon: 5,59<br>... | 98512<br>Mon: 15,14<br>... |

DIGITAL LOCATION-BASED DATA METHODS AND PRODUCT

CROSS-REFERENCES TO RELATED APPLICATIONS

This application is the National Stage of International Application No. PCT/EP2013/056497, filed Mar. 27, 2013 and designating the United States. The application claims priority from United Kingdom Patent Application No. 1205348.4, filed Mar. 27, 2012. The entire content of both these applications is incorporated herein by reference.

FIELD OF INVENTION

The present invention relates to methods of creating digital location-based data indicative of data relating to travel between origin and destination pairs. In particular, the present invention relates to methods of creating digital location-based data indicative of data representing a count of journeys made between origin and destination pairs within different predetermined time periods. The invention also relates to products comprising such data.

BACKGROUND TO THE INVENTION

It is often useful to obtain data regarding travel between given origin and destination locations ("an origin-destination pair"). Such data may be used to provide a so-called "origin-destination matrix", relating to travel between the origin and destination for each of a plurality of different origin-destination pairs. Origin-destination travel data may be obtained reflecting various parameters of travel between an origin and destination pair or pairs. For example, the data may relate to speed of travel or a count of journeys made. Such location-based information may be used in a wide range of applications, including, for example, infrastructure planning, identifying traffic levels associated with certain journeys, and also for the selection of locations, e.g. for commercial premises, advertising purposes, etc.

A basic set of data representing a count of journeys between different origin-destination pairs may be in the form of an origin-destination matrix, containing an array of data representing the count of journeys made between each origin and destination. An origin-destination matrix of this type provides a compact way of storing the relevant data. However, conventional origin-destination matrices suffer from the disadvantage that time related information, such as the time of departure and/or arrival is lost. Techniques for providing origin-destination matrices relating to a count of journeys between origin-destination pairs, and which incorporate information regarding a time dependence of the data, have been proposed, based upon data generated by road-side traffic counters. Such origin-destination matrices may be referred to as "dynamic" matrices, reflecting the time dependence of the data. The time information may be incorporated as a further dimension in the origin-destination matrix. Obtaining data using road-side traffic counters is relatively expensive, and represents an inflexible approach, relying upon the necessary infrastructure to be in place. It can be seen that it may be difficult to obtain extensive data relating to large numbers of origin-destination pairs and different predetermined time periods using data obtained in this manner. Further challenges remain in storing the large quantities of data involved, when time-related information is included.

The Applicant has realised that there remains a need for improved methods of obtaining time dependent information relating to a count of journeys made between different origin-destination pairs, and for products comprising such data.

SUMMARY OF THE INVENTION

In accordance with a first aspect of the present invention there is provided a method of creating digital location-based data, the method comprising:

receiving positional data relating to the movement of a plurality of devices with respect to time in a geographical region;

filtering the positional data to obtain, for each of a plurality of origin-destination pairs in the geographic region, positional data relating to the travel of devices between the origin and destination;

analysing the filtered positional data to provide one or more sets of profiles, the or each set of profiles including a profile, in respect of each origin-destination pair, representing a count of journeys made between the origin and destination within each of a plurality of different predetermined time periods;

using the or each set of profiles to generate a set of standard profiles, wherein each profile of the one or more sets of profiles may be represented by one of the set of standard profiles;

identifying, for the or each profile from the one or more sets of profiles in respect of a given origin-destination pair, one of the set of standard profiles which may be taken to represent the profile; and storing digital location-based data, said location-based data comprising data indicative of the location of each origin-destination pair in association with data indicative of the or each standard profile identified as representing a profile in respect of the origin-destination pair.

Further, and in accordance with another aspect of the present invention there is provided a system arranged to create digital location-based data, the system comprising:

means for receiving positional data relating to the movement of a plurality of devices with respect to time in a geographical region;

means for filtering the positional data to obtain, for each of a plurality of origin-destination pairs in the geographic region, positional data relating to the travel of devices between the origin and destination;

means for analysing the filtered positional data to provide one or more sets of profiles, the or each set of profiles including a profile, in respect of each origin-destination pair, representing a count of journeys made between the origin and destination within each of a plurality of different predetermined time periods;

means for using the or each set of profiles to generate a set of standard profiles, wherein each profile of the one or more sets of profiles may be represented by one of the set of standard profiles;

means for identifying, for the or each profile from the one or more sets of profiles in respect of a given origin-destination pair, one of the set of standard profiles which may be taken to represent the profile; and means for storing digital location-based data, said location-based data comprising data indicative of the location of each origin-destination pair in association with data indicative of the or each standard profile identified as representing a profile in respect of the origin-destination pair.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, the created digital map data.

The present invention therefore provides a method which uses positional data relating to the movement of devices to obtain time dependent data relating to a count of journeys made between origin and destination pairs. This positional data, sometimes known as "probe data", may be data relating to the movement of devices associated with vehicles or pedestrians. This approach avoids the need to rely upon a fixed infrastructure, such as road-side traffic counters to obtain the data, allowing more detailed analysis to be carried out, involving more origin-destination pairs as desired, and providing greater flexibility in the selection of origin-destination pairs. For example, different sets of data may be obtained for different end uses, simply by selecting different sets of positional data. A food retailer may be interested in journeys made between different origin-destination pairs than someone wishing to advertise children's products. This opens up the option of a greater number of applications for the data, and the provision of customised data to clients' specifications.

The present invention involves using the positional data to obtain one or more sets of profiles representing a count of journeys made between different origin-destination pairs for different predetermined time periods. In accordance with the invention, the method involves a further step in which these profiles are used to obtain a set of standard profiles, such that one of these standard profiles may be used to approximate the or each specific profile which was obtained representing the time dependent origin-destination journey count data for each origin-destination pair. This may result in significant reductions in the amount of data which needs to be stored. The number of profiles which need to be stored is therefore reduced, and it is possible to simply store a reference to a standard profile or profiles in association with a given origin-destination pair, rather than the full profile. The aggregation of profiles to obtain the standard profiles provides further benefits in avoiding privacy issues which could otherwise arise from the use of such positional (or probe) data. It will be appreciated that the use of such positional data can, in any event, result in anonymity of those sources from whom the data is derived when sufficiently large origin-destination sets or sets of positional data are used.

In accordance with the invention, the method involves receiving the positional data. The positional data is data relating to movement of the plurality of devices in a geographic region. The geographic region is a region which includes the origin-destination pairs for which profiles are to be generated. The region may be of any extent. For example, positional data may be received relating to journeys made in a relatively large area, such as an entire country, or a more limited area such as a district, etc. The region may be a region of a digital map. It is not intended that data is necessarily received only for a region selected by reference to the position of the origin-destination pairs. The positional data may be historical positional data that is not necessarily received specifically for the purposes of the present invention.

The step of receiving the positional data may or may not comprise receiving the data from the devices. In some arrangements the step of receiving the data may comprise accessing the data, i.e. the data being previously received and stored. In arrangements in which the step of receiving the data involves receiving the data from the devices, it is envisaged that the method may further comprise storing the received positional data before proceeding to filtering the data and carrying out the other steps of the present invention. The step of receiving the positional data need not take place at the same time or place as the other step or steps of the method. In embodiments the positional data is in the form of a plurality of positional (or probe) traces, each representing the position of a device at different times.

In embodiments the positional data is received at a central controller, such as a server system. For example, the central controller may be a controller of a navigation system associated with a plurality of devices, e.g. navigation devices, used to provide positional data. The positional data is collected from multiple devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the profiles of the present invention. For example, temporal data may be associated with some but not all positional data provided that this enables a count of journeys to be obtained between an origin and destination in different predetermined time periods. Thus, time data may be associated with positional data only for some positions, such as the positions of origin-destination pairs. However, in preferred embodiments all positional data is associated with temporal data, e.g. a timestamp.

The positional data relates to the movement of the devices with respect to time, and may be used to provide a positional "trace" of the path taken by the device. As mentioned above, the data may be received from the devices or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc. The device may be associated with a vehicle. In these embodiments the position of the device will correspond to the position of the vehicle. The vehicle may then be a powered or non-powered vehicle, such as an automobile, train, boat, bicycle, etc. The device may be integrated with the vehicle e.g. in-built sensor or navigation apparatus, or may be a separate device associated with the vehicle such as a portable navigation apparatus. The present invention is not limited to the use of vehicle positional data, however, and the data may be obtained from devices associated with pedestrians. For example, the device may be any device which may be carried or worn or otherwise associated with a pedestrian such that the position of the device will correspond to the position of the pedestrian. Examples include mobile telecommunication devices, GPS watches, etc. Of course, the positional data may be obtained from a combination of different devices, or a single type of device, e.g. devices associated with vehicles.

References herein to the travel of the devices refer to the movement thereof, and "journeys" to movement between the specified locations. Such travel or journeys will correspond to the travel or journeys taken by a vehicle or person with which the device is associated.

The positional data obtained from the plurality of devices is commonly known as "probe data". The data obtained from devices associated with vehicles or pedestrians respectively may be referred to as vehicle or pedestrian probe data. References to "probe data" herein should therefore be understood as being interchangeable with the term "positional data", and the positional data may be referred to as probe data for brevity herein.

In accordance with the invention, the received positional data is filtered to obtain, for each of a plurality of origin-destination pairs, positional data relating to travel between the origin and destination. Preferably the filtering is carried out on received historical positional data. Thus the data may be received, optionally stored, and subsequently filtered. The filtering may be carried out in any suitable manner using known techniques. The filtering step extracts positional traces which originate at the origin and terminate at the destination for each one of the plurality of origin and destination pairs. This may be done by reference to the location of the origin and destination. In preferred embodiments in which the positional data is in the form of a plurality of positional or probe traces, the positional traces are filtered in accordance with the method of the present invention.

Each origin-destination pair is a predefined origin-destination pair. The origin and destination are respective geographic locations. The method may comprise specifying each origin-destination pair, and may involve providing location information identifying each origin-destination pair. The method may comprise identifying each origin-destination pair on a digital map. Such location information may then be used as a criteria in filtering the received positional data. The following discussion, and any other discussion referring to "the origin-destination pair" may, unless the context demands otherwise, be understood to be applicable to the, a or preferably each origin-destination pair.

The pair may be selected according to any desired criteria, depending upon the intended application of the data. The origin and destination may be any type of location. For example, the origin and destination may be point locations or other specific locations. However, in preferred embodiments, the origin and destination are locations in the form of geographic zones. The term "zone" refers to an extended geographic location, rather than a point location. The origin and destination zones may be sub-regions of the geographic region in respect of which positional data is received. Where the origin and destination locations are zones, the positional data extracted as relating to travel between a given origin-destination pair, may include positional traces extending between different origin and destination points, provided that the points are located in the relevant origin or destination zone.

The origin and destination locations may, whether they are points or zones, be real or virtual locations. The origin and destination locations may be specified locations on a digital map. In some embodiments the origin and destination are geographic zones in the form of a town, city or administrative area, or a sub region thereof. Of course, the zones may be defined in any manner, and may be defined for the purposes of a particular investigation, e.g. for traffic or infrastructure planning. In some arrangements the zones may be virtual zones, e.g. geo-fenced zones or zones corresponding to tiles of a digital map. Likewise, where the locations are in the form of point locations, they may be real or virtual locations. Real locations may be specified coordinates, points in a city or town, etc. Virtual points might be the centre or other predetermined point of a digital map tile. In other arrangements a point location might be a centroid of a location related statistical distribution, e.g. a centroid of a distribution of population density.

The method of the present invention involves analysing the filtered positional data to provide one or more sets of profiles each including a profile, for each origin-destination pair, representing a count of journeys made between the origin and destination within each of a plurality of different predetermined time periods. It will be appreciated that this step may be carried out separate from, and subsequent to the step of filtering the positional data, or may be carried out at least in part, simultaneously therewith. For example, as each relevant positional trace relating to travel between an origin-destination pair is extracted or filtered out from the body of positional data, it may be used to increment a count of the number of journeys between that origin-destination pair. Thus, the data that is used to provide the count is filtered in that it has been extracted from the bulk of the positional data, with the filtering potentially occurring as part of the analysis process which provides the count of journeys. In embodiments, the count of journeys is in the form of a count of positional traces relating to travel between the origin and destination for each of the predetermined time periods. Each positional trace between the origin and destination for the relevant time period may be taken to represent one journey between the origin and destination.

It will be appreciated that the, each or a profile in respect of a given origin-destination pair may or may not represent a count of all journeys between the origin and destination in each respective predetermined time period. For example, the profile may represent a count of journeys between the origin and destination via one or more intermediate locations, or may represent a count of journeys made by particular types of device, e.g. associated with a vehicle or pedestrian. Thus, in some arrangements the method may comprise filtering the positional data to obtain positional data relating to travel between the origin and destination satisfying one or more further criteria, e.g. in relation to route taken (e.g. via point(s)), category of vehicle, etc. This may be implemented by appropriate filtering of the positional data, e.g. to obtain positional data relating to travel between the origin and destination and meeting one or more further criteria, and analysing the so-filtered data. This may be done in addition to or alternative to obtaining positional data relating to all journeys between an origin-destination pair, i.e. not meeting the further criteria.

It is envisaged that the or each set of profiles may include one or more profiles in respect of each origin-destination pair, representing a count of journeys made between the origin and destination within each of a plurality of different predetermined time periods. Thus, a given set of profiles may include, in respect of one or more of the origin-destination pairs, one or more profiles representing a count of journeys made between the origin and destination within each of the plurality of different predetermined time periods, and which journeys meet at least one additional criteria. Where multiple such profiles are provided, they may be in respect of different additional criteria. In preferred embodiments the additional criteria relate to the route taken between the origin and destination. For example, a first profile may relate to the count of journeys made between the origin and destination via a first specified intermediate location, and a second profile may relate to a count of journeys made between the origin and destination via a second specified intermediate location. In embodiments, it is preferred that each set of profiles includes a profile for each origin-destination pair which represents a count of all journeys made between the origin-destination pair during the plurality of predetermined time periods. The set of profiles may then include one or more additional profiles for one or more of the origin-destination pairs representing the count of journeys which meets one or more additional (different) specified criteria. It will be appreciated that the additional criteria may or may not be relevant for each origin-destination pair, and additional profiles may only be obtained for certain origin-destination pairs. Furthermore, the number of additional profiles may vary for different origin-destination pairs. In one example, the number of possible routes, or at least possible routes which it is desired to consider, may vary between different origin-destination pairs.

The intermediate locations may be point locations or extended locations or zones as described in respect of the origin-destination pairs themselves. For example, intermediate locations may be roads or towns, etc.

In preferred embodiments the method comprises, for one or more of the plurality of origin-destination pairs, defining one or more intermediate locations between the origin and destination locations, and filtering the positional data to obtain positional data relating to travel between the origin and destination locations via the intermediate location or locations, wherein the step of analysing the filtered positional data provides one or more profiles for each of the one or more origin-destination pairs representing a count of journeys made between the origin and destination location via the intermediate location or locations within each of a plurality of different predetermined time periods. Of course, where profiles relating to travel meeting additional criteria are provided, while this may advantageously be done by appropriate filtering of the positional data before it is analysed, it is envisaged that the filtering out of relevant data for obtaining the profiles meeting additional criteria could be carried during the step of providing the profiles.

The following discussion in respect to the profiles applies to any of the profiles of the or each set of profiles as applicable.

The profile is in the form of a distribution representing the count of journeys made in each predetermined time period. Preferably each profile is in the form of a histogram. The histogram represents a count of journeys against time for the given origin-destination pair. It will be appreciated that other forms of profile may be used.

Each predetermined time period for which the count of journeys is represented in a given profile may be any specified time period. In embodiments, each of the different predetermined time periods may be of any suitable duration, and preferably are each of the same duration. In preferred embodiments, the predetermined time periods are periods of one hour. The different predetermined time periods may be at any desired interval. In some embodiments the duration of each time period is the same as the interval between different predetermined time periods. In preferred embodiments the interval is one hour. Thus, a count representative of a count of journeys made between the origin and destination over a period of one hour may be obtained at hourly intervals. Of course, other periods and/or durations may be used, depending upon the required resolution of the data, and the compactness of data required. As a result of the use of references to standard profiles, the present invention considerably reduces data storage requirements, allowing greater resolution of data. Other possible time periods include: 1 minute, 5 minutes, 10 minutes, 15 minutes, 30 minutes, 2 hours, 6 hours, 12 hours, or any time in between these times. Similarly, intervals may be chosen at any desired value. Preferably the intervals are regular intervals. In preferred embodiments the different predetermined time periods used are the same for each profile, i.e. for each origin-destination pair, and as appropriate, for each set of profiles. This may facilitate comparison of profiles for different pairs. In some embodiments the method further comprises specifying the plurality of predetermined time periods for use in the or each profile. Preferably the predetermined time periods are time periods within a 24 hour period, i.e. within a given day of the week.

It will be appreciated that at least one set of profiles is provided, including one or more profile for each origin-destination pair, representing a count of journeys made between the origin and destination for a or the plurality of different predetermined time periods. In preferred embodiments multiple sets of profiles are provided. In these embodiments, each set of profiles will include a profile or profiles (e.g. relating to different additional criteria) for each origin-destination pair representing the count of journeys made between the origin and destination for a plurality of different predetermined time periods. The different sets of profiles may be in respect of different times, e.g. days of the week. For example, a first set of profiles may include profiles representing a count of journeys made between each origin and destination pair for a plurality of different predetermined time periods on one given day of the week, and one or more additional sets of profiles may be provided in respect of the count for a plurality of different predetermined time periods on another day or days of the week. To facilitate comparison, the predetermined time periods are preferably the same for each set of profiles i.e. the same times of day. A set of profiles may be provided in respect of a plurality of days of the week, or preferably each day of the week.

Such arrangements are merely exemplary. It will be appreciated that sets of profiles may be provided alternatively or additionally in respect of different months, seasons, etc. The selection of the time periods for each profile within a given set of profiles, or for different sets of profiles as appropriate, may be varied widely depending upon the intended application and data resolution required, and the nature of the origin-destination pairs. For example, it may not be necessary to obtain profiles for each day of the week, but rather a representative profile for a weekday and one for a weekend. Similarly time periods associated only with peak and off peak commuter times, or school run times may be used.

As at least some of the positional data includes time data associated with the position data, it will be appreciated that the filtered positional data relating to travel between a given origin-destination pair may readily be used to provide a count of journeys made in any given predetermined time period. In embodiments the positional data is associated with temporal data, e.g. a timestamp. This may be done by reference to the time information associated with the positional data, e.g. a positional trace, and the time or times defining the predetermined time period, which will enable a given positional trace to be assigned to a particular time period for incrementing a count associated with that period.

The step of providing the profiles may be achieved using the filtered positional data in any desired manner. In embodiments the method comprises assigning the filtered positional data, e.g. positional traces, for each origin-destination pair to one of the plurality of predetermined time periods for use in providing the profile for that origin-destination pair. In some embodiments the data may have been filtered such that the filtered positional data meets one or more additional criteria, e.g. relating to the route taken, or alternatively may be selected from filtered positional data relating to all journeys between the origin and destination for use in providing the profiles according to the relevant criteria. Whether or not the positional data is further selected according to further criteria, assigning filtered positional data to the time periods may be done by a binning process. Thus, in some embodiments, the positional data for each origin-destination pair is assigned to a given one of a plurality of bins, each being representative of a given one of the plurality of different predetermined time periods. The count of data in each bin against the relevant predetermined time period may then provide a suitable profile in the form of a histogram for the relevant pair.

The method may involve carrying out additional steps to facilitate comparison between the profiles thus obtained. This may be useful in generating standard profiles using the set of profiles as discussed below. In preferred embodiments the method involves normalising each profile.

Positional data, e.g. a positional trace, may be taken to relate to travel within a given predetermined time period, and thus contribute to the count for that period, by reference to an arrival or departure time of the device, or some other reference time, provided that a consistent approach is used when deriving each profile for a set of profiles. In accordance with the invention, at least one set of profiles is obtained including a profile in respect of each origin-destination pair representing a count of journeys made in a plurality of different time periods. In some embodiments the set of profiles obtained includes a profile in respect of each origin-destination pair that represents a count of the number of journeys made having an arrival time at the destination within the predetermined time periods or a departure time at the origin within the predetermined time periods.

In some preferred embodiments the method further comprises obtaining a plurality of sets of profiles, each set of profiles including a profile, for each origin-destination pair, representing a count of journeys made between the origin and destination within each of a plurality of different predetermined time periods. In some embodiments, wherein a first set of profiles is obtained including a profile in respect of each origin-destination pair, each profile representing a count of the number of journeys made having an arrival time at the destination within the predetermined time periods or a departure time at the origin within the predetermined time periods, the method further comprises obtaining a second set of profiles including a profile in respect of each origin-destination pair, each profile representing a count of the number of journeys made having the other of a departure time from the origin within each of the predetermined time periods and an arrival time at the destination within each of the plurality of predetermined time periods. In some embodiments multiple sets of profiles may be provided by reference to arrival time, e.g. relating to different predetermined time periods on different days of the week, and multiple sets of profiles may be provided by reference to departure time, e.g. relating to different predetermined time periods on different days of the week.

In some embodiments the positional data is analysed to provide one or more of:

a set of profiles including a profile, for each origin-destination pair, representing a count of journeys made between the origin and destination within each of a plurality of predetermined time periods, and having a departure time from the origin within the predetermined time periods;

a set of profiles, including a profile, for each origin-destination pair, representing a count of journeys made between the origin and destination within each of a plurality of predetermined time periods, and having an arrival time at the destination within the predetermined time periods; and a set of profiles including a profile, for each origin-destination pair, representing a count of journeys made between the origin and destination within each of a plurality of predetermined time periods for each of a plurality of different days of the week, and preferably for each day of the week.

In some embodiments the positional data is analysed to provide multiple sets of profiles, each including a profile for each origin-destination pair representing a count of journeys made between the origin and destination pair within each of a plurality of predetermined time periods, wherein the sets of profiles are in respect of a plurality of predetermined time periods on each of a plurality of different days of the week, and preferably of each day of the week, and wherein, for each of the plurality of days of the week, or preferably each day of the week, a set of profiles is provided including a profile for each origin-destination pair representing a count of journeys having a departure time from the origin within the predetermined time periods, and a departure time from the origin within the predetermined time periods respectively.

The description herein, referring to the or the "first" set of profiles, and the profiles thereof, may apply equally to any additional set of profiles, where multiple sets of profiles are provided. Thus, each additional set of profiles, or profile therein, may be derived in a similar manner to that described by reference to the first set of profiles, but, for example, varying in relation to the reference point of the predetermined time periods.

In a conventional time dependent origin-destination matrix, incorporating information regarding the number of journeys made between an origin and destination in each of a number of different time periods would result in the matrix needing to have a number of dimensions equal to the number of time periods. For example, in order to represent a count of journeys in respect of departure from the origin within a 1 hour period at hourly intervals on a given day, this would amount to 24 counts per day. If corresponding data is obtained for each day of the week, this would amount to 168 counts to be stored in the matrix. If corresponding data is obtained in respect of arrival at the destination within 1 hour periods, again at hourly intervals for each day of the week, this would add another 168 counts to be stored in the matrix. In order to capture this resolution of data, considerable data storage capacity would be required. In accordance with the present invention, the use of profiles representing the count associated with multiple different time periods for a given origin-destination pair may help to reduce the amount of data being stored. For example, only one profile is required to represent counts of journeys over a 1 hour period at hourly intervals in a given day, having either an arrival or departure time in the relevant period. Nonetheless, the Applicant has recognised that it is desirable to develop a still more efficient way of representing such data. To this end, in accordance with the invention, additional steps are taken which may allow detailed time dependent information from the profiles to be retained, but without requiring excessive storage capacity.

In accordance with the present invention, the or each set of profiles is used to obtain a set of standard profiles. The size of the set of standard profiles may be chosen as desired, and will typically depend upon the storage capacity that may be devoted to storing the standard profiles. To avoid confusion, it will be seen that the or each set of profiles obtained by analysing the positional data as set out above may be referred to as the or each set of "actual" profiles, to distinguish them from the standard profiles.

In accordance with the invention, the set of standard profiles is such that each profile of the or each set of (actual) profiles can be represented by one of the set of standard profiles. In practice, more than one of the actual profiles can be represented by the same standard profile. As there will typically be fewer standard profiles than actual profiles, this leads to savings in the amount of data that must be stored. A standard profile may be used in place of each actual profile, and may be considered an approximation to the actual profile. In some cases, it may be the actual profile, if that profile has been chosen as a standard profile, although typically it would be an aggregation of a number of actual profiles.

In embodiments of the invention, the method involves identifying, for the or each (actual) profile from the one or more sets of profiles in respect of a given origin-destination pair, one of the set of standard profiles which may be taken to represent the profile. The method may comprise identifying that the same given standard profile is to be taken to represent each one of a plurality of profiles from a given set of profiles. Alternatively or additionally where multiple sets of profiles are used, the method may comprise identifying that the same given standard profile is to be taken to represent profiles from different sets of profiles.

It will be appreciated that where multiple sets of profiles are obtained including profiles for each origin-destination pair representing a count of travel between the origin and destination for a plurality of different predetermined time periods, e.g. for different days of the week, each set of profiles is preferably used in obtaining the set of standard profiles. Likewise, where multiple profiles are obtained in a given set of profiles for each origin-destination pair, e.g. relating to different routes, these may all be used in obtaining the standard profiles. This may be done by taking each set of profiles together and generating a single set of standard profiles which may be used to represent profiles from each set of profiles, or could be done by obtaining a subset of standard profiles for representing profiles from a respective set of actual profiles. It has been found that although different sets of profiles may relate, e.g. to different reference times, e.g. arrival or departure in the relevant time period, or different days of the week, it is still possible to generate a standard set of profiles which is applicable to multiple sets of profiles. Thus a given standard profile may be used to represent an actual profile from any set of profiles. This may lead to further consolidation in the number of standard profiles required, and data storage requirements. Accordingly, in preferred embodiments where multiple sets of profiles are provided, the method comprises using each set of profiles to obtain a set of standard profiles common to all sets of profiles, i.e. that can be used to represent profiles from each set of profiles.

It will be appreciated that, in accordance with the invention in any of its embodiments, the set of standard profiles will be a "reduced set" of profiles by comparison to the total number of profiles used to obtain the set of standard profiles, i.e. the total of the numbers of profiles in the or each set used, and preferably by comparison to the number of profiles in any set of profiles used. Preferably the standard profiles are normalised profiles.

In preferred embodiments the standard profiles are in the form of a distribution of a count of journeys between an origin and destination for each of a plurality of different predetermined time periods, and preferably are in the form of histograms.

The process of obtaining the set of standard profiles may be carried out in any suitable manner, and typically involves the use of a machine learning process. The generation of the standard profiles may involve placing the profiles from the or each set of actual profiles into groups of similar profiles, e.g. according to shape, such that each group may be represented by a suitable standard profile. In accordance with a preferred embodiment of the invention, the method comprises placing the profiles from the or each set of profiles into a plurality of groups, wherein the profiles in each group are of similar shape, and determining, for each group, a standard profile which is representative of the shape of all profiles in the group. Each of the profiles in a given group may then be represented by the standard profile. Where multiple sets of actual profiles are used, preferably the groups contain profiles from more than one set, and preferably each set of actual profiles. Thus the standard profiles will be representative of the shape of profiles from any set or sets of profiles which are grouped together. Of course, in other arrangements, as mentioned above, it is envisaged that groups might contain profiles from only one set of profiles, and that standard profiles may be representative of profiles from only one group.

In some preferred embodiments the method comprises (and in embodiments, the step of placing the profiles into groups comprises) performing a clustering operation on the set or sets of profiles. This may be achieved using any suitable clustering algorithm or algorithms. Some suitable techniques are described, for example, in WO 2009/053411 entitled "A Method of Creating Map Data"; the entire contents of which is incorporated herein by reference. In some embodiments a Principal Component Analysis (PCA) operation may additionally be used. This may utilise any suitable PCA algorithm or algorithms, and may be used to reduce data sets before clustering is carried out. For example, some profiles may include little or no count data for certain time periods, e.g. when there is little traffic, and a PCA operation provides a way of identifying and disregarding such parts of the profiles when performing clustering, reducing the amount of processing required, potentially without significantly affecting the accuracy of the determined standard profiles.

The standard profiles used to represent the profiles in each group may be obtained in any suitable manner. For example, one of the actual profiles in a group considered representative of all profiles in the group may be taken as the standard profile for the set of profiles allocated to the group. Preferably, however, the standard profile for a given group is an average of the profiles of the group. For example, standard profiles could be generated using any suitable form of averaging operation by reference to multiple ones or all of the profiles in a given group.

The method of the present invention further comprises storing digital location-based data on a suitable data storage means, such as a computer readable medium. The location-based data comprises data indicative of the location of each origin-destination pair in association with data indicative of the or each standard profile identified as representing a profile in respect of the origin-destination pair. In other words, the or each set of profiles includes one or more profiles in respect of each origin-destination pair, relating to a count of journeys made between the origin and destination for the predetermined time periods. Thus, for each origin-destination pair, each of these profiles in respect of the pair, i.e. a profile or profiles from the or each set of profiles depending upon whether there are one or more sets of profiles, is represented by a standard profile, and there may be one or more standard profiles to be associated with the pair. The standard profiles may or may not be the same for each profile associated with a given pair. While the same given standard profile may be used to represent a profile from more than one set of profiles for a given origin-destination pair, typically the standard profiles representative of profiles from the different sets will differ for a given origin-destination pair. For example, where sets of profiles are based respectively on arrival at a destination and departure from an origin within a given predetermined time period, a different standard profile may be used to represent the arrival time profile and the departure time profile for that origin-destination pair. Multiple profiles may be stored relating to travel between the origin-destination pair via different routes.

In accordance with the invention, the data indicative of each origin and destination pair location is stored in association with data indicative of the standard profile or profiles for the origin-destination pair. Thus the present invention creates digital location-based data. The data indicative of the location of an origin-destination pair may be stored as a point location or an extended location, e.g. a road segment, etc. While the actual profile, i.e. distribution, may be stored, in some preferred embodiments the data indicative of the standard profile or profiles is data providing a reference which may be used to access the profile or profiles. Thus, in some embodiments the standard profiles may be stored together, e.g. in a central, possible remote, location, and may be accessed using the reference data stored in association with the origin-destination location data. In one exemplary embodiment, the data indicative of a standard profile may be a reference number or code for the profile. Likewise, the data indicative of the location of the origin-destination pairs may be location data, e.g. coordinates, or may be a code or other reference enabling the relevant location information to be accessed.

In some embodiments the location-based data is stored in an origin-destination matrix. The origin-destination matrix includes data indicative of the location of each of a plurality of origin-destination pairs, and data indicative of the or each standard profile for each origin-destination pair.

In embodiments the method further comprises storing information indicative of the set of profiles to which each standard profile associated with the origin-destination pair relates. This may be any form of label. For example, where multiple sets of profiles correspond to different days of the week, a standard profile for each day of the week may be associated with each origin-destination pair. The relevant data identifying the standard profile may be associated with data identifying the day of the week.

In some embodiments, the or each profile, and accordingly the or each standard profile, is normalised. This may be with respect to a total count for all journeys in respect of a given origin-destination pair, i.e. a sum of the total counts associated with each profile, i.e. from each set of profiles, in respect of the origin-destination pair. In some embodiments the method further comprises, for each origin-destination pair, storing data in association with the data indicative of the location of the origin-destination pair, which data is indicative of a total count of journeys between the origin-destination pair. The data may be stored in an origin-destination matrix. The present invention extends to a data product comprising said stored data.

Thus, in accordance with a further aspect of the invention, there is provided a data product comprising stored digital location-based data, said location-based data comprising data indicative of the location of each of the plurality of origin-destination pairs in association with data indicative of one or more standard profiles representing a count of journeys made between the origin and destination within each of a plurality of different predetermined time periods, wherein the data indicative of the or each standard profile has been obtained according to the method of the present invention in any of its aspects or embodiments.

In accordance with a further aspect of the invention there is provided a data product comprising stored digital location-based data, said location-based data comprising data indicative of the location of each of a plurality of origin-destination pairs in association with data indicative of one or more standard profiles representing a count of journeys made between the origin and destination within each of a plurality of different predetermined time periods, wherein the data product has been obtained according to a method comprising:

receiving positional data relating to the movement of a plurality of devices with respect to time in a geographical region;

filtering the positional data to obtain, for each of a plurality of origin-destination pairs in the geographic region, positional data relating to the travel of devices between the origin and destination;

analysing the filtered positional data to provide one or more sets of profiles, the or each set of profiles including a profile, in respect of each origin-destination pair, representing a count of journeys made between the origin and destination within each of a plurality of different predetermined time periods;

using the or each set of profiles to generate a set of standard profiles, wherein each profile of the one or more sets of profiles may be represented by one of the set of standard profiles;

identifying, for the or each profile from the one or more sets of profiles in respect of a given origin-destination pair, one of the set of standard profiles which may be taken to represent the profile; and storing digital location-based data, said location-based data comprising data indicative of the location of each origin-destination pair in association with data indicative of the or each standard profile identified as representing a profile in respect of the origin-destination pair.

The stored data may be in accordance with any of the embodiments described above.

In embodiments in which profiles are obtained representative of a count of journeys between an origin and destination via one or more intermediate locations, the method of the present invention may further comprise storing additional data indicative of the location of the or each intermediate location in association with the digital location-based data. The location-based data in such embodiments therefore comprises: data indicative of the location of one or more origin-destination pairs; data indicative of the location of one or more intermediate locations between the one or more origin-destination pairs; and data indicative of the or each standard profile identified as representing a profile in respect of each origin-destination pair. The data product of the further aspects of the invention may include such data. In some embodiments the additional data is stored in a further dimension of the origin-destination matrix. Thus, for each origin-destination pair having route dependent data, there may be another dimension included in the matrix referring to the relevant intermediate point, and the standard profiles for travel via that route.

The data product in any of these further aspects or embodiments of the invention, may be of any suitable form. In some embodiments the data product may be stored on a computer readable medium. The computer readable medium may be, for example, a diskette, CD ROM, ROM, RAM, flash memory or hard disk. The present invention extends to a computer readable medium comprising the data product in accordance with the invention of any of its aspects or embodiments.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The location-based data obtained in accordance with the present invention may find utility in a wide range of applications. One particularly useful application is in determining a location for a site. In some embodiments the method further comprises using the stored data to select a location for a site. The location-based data provides information regarding a pattern of travel between different origins and destinations, enabling an informed decision to be made, for example, as to where to locate a site so as to have the greatest likelihood of being seen or used by a target group. For example, particular groups of consumers may be targeted by using the data to determine which origin-destination pairs are associated with higher counts at times of interest. Sites might be retail sites, or billboards, etc. Other applications of the data may be in infrastructure planning, such as planning new road, railway or other transport systems, or planning of new building developments, such as by reference to pedestrian movements in an area. Further options are discussed below.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the present invention will now be described by way of example only and by reference to the accompanying drawings of which.

DETAILED DESCRIPTION OF THE PREFERRED EMBODIMENTS

Figure 1:
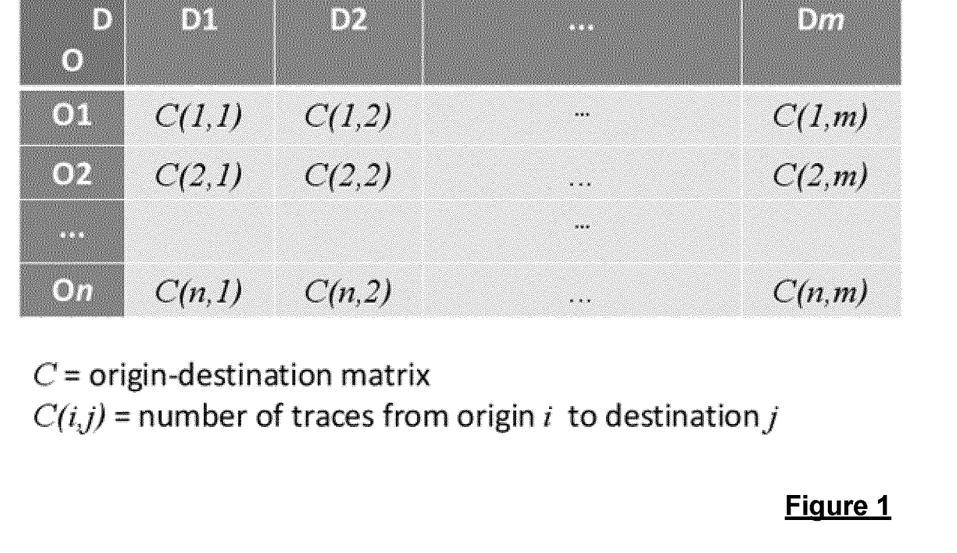
FIG. 1 illustrates a conventional origin-destination matrix.

By way of background, FIG. 1 illustrates a conventional origin-destination matrix C based on vehicle probe data. This matrix represents a number of origin-destination pairs: (O1,D1), (O1,D2), ... (On,Dm). In respect of each origin-destination pair (i,j), a count $C(i,j)$ is stored in the matrix. The count is the number of probe traces having the respective origin i and destination j. The count of probe traces is taken to represent the number of journeys made from the origin to the destination. One disadvantage of this type of origin-destination matrix is that time related information is not captured. For example for a given origin-destination pair (O1,D1), the matrix simply stores a total count for the number of journeys which are considered to have taken place between the origin and destination based on the number of probe traces extending from the origin-destination over a given period used to sample the probe data. There is no information present as to how the count of journeys is distributed with respect to time, e.g. how it might vary over the day. For example, it is not possible to tell whether there is a rush hour type period in the morning and evening or not.

There have previously been attempts to incorporate a time dependence of data into an origin-destination matrix product, albeit in respect of an origin-destination matrix product obtained using non probe data, e.g. fixed sensor data. This can be done by storing a count of journeys made between each origin and destination in respect of each of a plurality of given predetermined time periods. Such information may be incorporated in an origin-destination matrix product by adding a further dimension to the matrix for each time period that is to be taken into account. For example a count may be stored for each origin-destination pair for a period between 9.00 am and 10.00 am, resulting in a matrix of the type shown in FIG. 1. Another such matrix would need to be stored for the counts in respect of each origin-destination pair for the next time period, e.g. 10.00 am and 11.00 am, and so on. This would result in 24 matrices having to be stored per day in respect of counts over 1 hour periods in order to cover all times over the 24 hour period. In order to include corresponding data for each at a weekday, a total of 24×7 matrices would be required, i.e. 168 matrices. If a further resolution data were required, for example to include separate counts for departure time being within the relevant period and arrival times in a relevant period, this would double the number of matrices required to 336. The overall multi-dimensional matrix C capturing data for N time periods, would be made up of a number of matrices $C_1 \ldots C_N$, such that the overall count for a particular origin-destination pair would be the sum of the counts for the origin-destination pair in each matrix, i.e. the sum of counts for each different time period. In this example, for an origin-destination pair i,j:

$$C(i, j) = \sum_{k=1}^{N} C_k(i, j)$$

A multi-dimensional matrix of this order would require considerable processing and storage resources. Thus, such techniques do not provide a practical way to store detailed time dependence of origin-destination count data.

The present invention seeks to address the limitations associated with prior art techniques for introducing a time dependence into origin-destination matrix products. An embodiment of the present invention will now be described by reference to the flow chart in FIG. 2.

Figure 2:
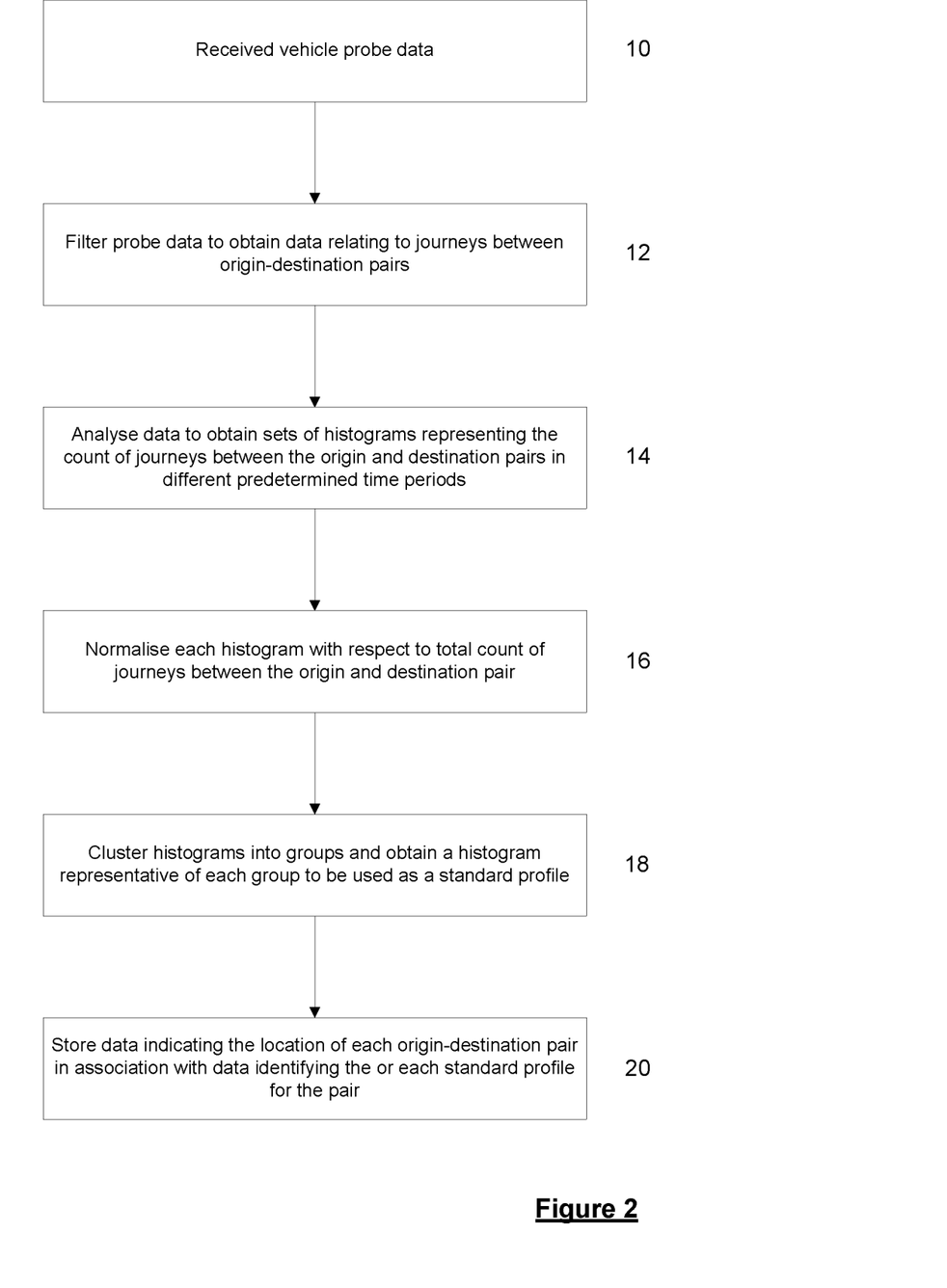
FIG. 2 is a flow chart illustrating one preferred embodiment of a method of the present invention.

In accordance with the invention, vehicle probe data is received—step 10. This may be at a central controller (or server). The vehicle probe data is data received from devices associated with the vehicles, e.g. GPS devices, whose position corresponds to that of the vehicle. The data may alternatively be referred to as "positional data". The probe or positional data is associated with temporal data. The probe data includes probe traces relating to travel of probe vehicles in a geographic region which includes various origin and destination pairs of interest. The origin-destination pairs may be selected as desired for a given application, and may be specified, or the method may involve specifying the locations of the origin-destination pairs to be considered. In the exemplary embodiment, the origins and destinations are in the form of zones, rather than point locations.

The received probe data is filtered to extract those probe traces relating to travel between each origin-destination pair—step 12. A total count of the journeys between each origin-destination pair may be determined at this stage. The probe data is typically stored before being filtered to extract the relevant probe traces. A volume of historical probe data may be stored and later used to obtain relevant probe traces for different sets of origin-destination pairs, depending upon the requirements of the end user of the data.

Once the data relating to travel between the origin-destination pairs of interest has been filtered out of the body of received probe data, in step 14 the data is used to create a histogram for each origin-destination pair representing the number of probe traces having a time of departure from the origin in one hour periods at 1 hour intervals over a 24 hour period. This is done by using a 24 bin histogram, and allocating traces to the relevant bin, depending on the time of departure from the origin. Thus, a probe trace between the origin and destination, departing from an origin O at 7.00 pm will be allocated to a bin for the time period 7.00 pm to 8.00 pm. Each probe trace allocated to a given time period increments the count for that period by one. The height of the bar for the relevant time period in the histogram corresponds to the number of probe traces allocated to that time period.

Figure 3:
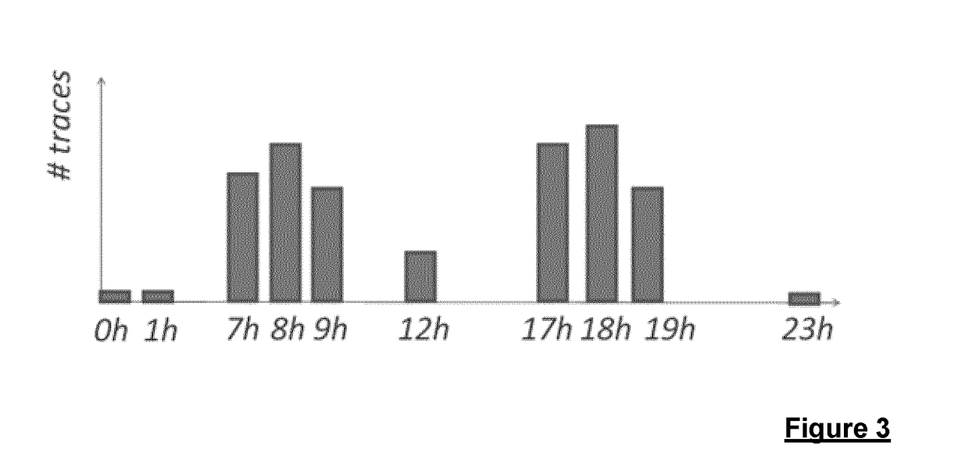
FIG. 3 is an example of a histogram for a given origin-destination pair obtained in accordance with the invention.

One exemplary histogram for a given origin-destination pair is shown in FIG. 3. The vertical axis represents the absolute or relative number of traces having a time of departure from the origin in each of the time periods along the horizontal axis. Although 24 bins were used, for some of the bins there are no traces, e.g. between 2 am and 7 am, and these are therefore not labelled.

The same exercise is carried out to provide a corresponding histogram for departure times from the origin in each one hour period on the same particular day for each other origin-destination pair. In this way, a set of profiles in the form of histograms are obtained, including one histogram in respect of each origin-destination pair, representing a count of traces between the origin and destination in each of a plurality of one hour periods on a particular day. The count of traces can be taken as the count of journeys as each probe trace represents one journey between the origin and destination.

A further set of histograms is obtained in a similar manner, by obtaining a histogram representing a count of traces for different corresponding time periods for each origin-destination pair, but in this case by allocating probe traces to the bins of the histogram according to their arrival time at the destination. For example the 7 pm to 8 pm bin would then represent the number of traces arriving at a destination D from an origin O in this period.

This process is repeated for each day of the week, to provide two sets of histograms for each day, for departure and arrival times within the relevant time periods. The time periods on each day will be the same. This provides a total of 14 sets of histograms, each including a histogram in respect of a given origin-destination pair.

Each histogram is normalised to a total count of traces between the relevant origin and destination—step 16. A total count of traces will be the total count taking into account the histogram from each set of histograms obtained which relates to that origin-destination pair, i.e. a histogram in respect of each day of the week, and for both departure and arrival times in the relevant time periods. The total count may be determined before or after the histograms are produced. For example, the count may be determined when the probe data is filtered by attributing the data to each origin-destination pair before allocating it to bins to obtain a histogram.

It will be appreciated that the duration of the predetermined time periods, and the interval between the time periods need not be as in this example, and may be selected within a wide range of values depending upon the intended use of the data, and the data resolution required. The present invention allows even relatively detailed time dependence information to be captured, e.g. relating to periods measured in minutes over the course of a 24 hour period, and without requiring excessive processing or data storage capacity. Similarly, it is not necessary that sets of histograms are obtained for each day of the week, or that arrival and departure time histograms are obtained. In other arrangements, sets of histograms might be obtained relating to different seasons, times of the month, etc.

The result of this analysis of the probe data is a large collection of histograms, each being a distribution representing the number of journeys made between a given origin-destination pair over particular time periods, e.g. 24 one hour periods on a given day of the week. In order to consolidate the histograms further, a set of standard histograms is established, such that each of the actual histograms derived from the probe data may instead be represented by one of the standard histograms—step 18. This may significantly reduce the number of histograms needed to represent the large quantity of data, as rather than storing each actual histogram, only the limited set of standard profiles need be stored.

In order to generate the standard profiles, the histograms are first sorted into groups of similarly shaped histograms. This may be done using any suitable technique, but in the present example a clustering technique is used. This may be implemented using any suitable clustering algorithm or algorithms as known in the art. If desired, dimension reduction techniques, such as Principal Component Analysis (PCA) may first be used to reduce the amount of bins which need be considered in the clustering stage. As known in the art, PCA is a method which transforms a data set with correlated values into a data set with uncorrelated values. As such, the number of dimensions can be reduced by only considering those new values with the highest variance. For example, in the example set out above, each histogram has 24 bins or dimensions. However, as FIG. 2 shows, some of the bins may be empty or nearly empty, e.g. those during the night where there is little or no traffic. Thus, some histograms could be represented by a histogram having fewer bins or dimensions without significantly affecting the accuracy of the data contained in the histogram. For example, a 24 bin or dimension histogram might be represented by an 18 bin or dimension histogram which still contains 98% of all variance. An appropriate balance may be obtained between the reduction of dimensionality that may be obtained by applying PCA to the histograms and the extent to which the detailed time dependence of data might be lost depending, e.g. upon the desired resolution of the end data, the processing power available, etc. It will be appreciated that dimension reduction may not always be implemented.

Whether or not dimension reduction is first carried out, the clustering stage involves assigning a set of objects, in this case the histograms, into groups, known as clusters, such that the objects or histograms in each group are relatively similar. The level of similarity is assessed by one or more predefined criteria as known in the art, which can identify existing, often unknown, patterns in the data.

By way of example, suppose there are 100 locations for which origin-destination information is to be obtained. This means that the origin-destination (OD) matrix will have $100^2=10000$ entries, being the total number of possible OD pairs. Further, there are histograms representing the count of journeys throughout a 24 hour period for departure and arrival times for each OD pair (×2), and for each day of the week (×7). The latter means that there will be 10000×2×7=140000 histograms. Many of those histograms will be similar to each other. Therefore, by applying a clustering technique, similar histograms will be grouped together in a cluster. In one example, it has been found that a set of 140000 histograms could be clustered into just 100 groups or clusters.

In accordance with the invention, once the histograms have been clustered into groups, however this is done, a histogram is obtained that is representative of all histograms in the group. This is a standard histogram or profile. Thus, in the example above, where there were 100 clusters, there will be 100 standard histograms. All histograms assigned to a given cluster will be represented by the standard histogram for that group. The standard histogram may be determined using any suitable technique, such as some form of averaging. In one example, the histogram is the centroid of the cluster, i.e. the mean of all histograms in the cluster. In other arrangements the histogram may simply be one of the histograms in the cluster.

Next, in step 20, data identifying the location of each origin-destination pair is stored in association with data identifying the or each standard histogram associated with that origin-destination pair. In the example described above, a number of different standard histograms will be associated with each origin-destination pair, approximating each histogram originally obtained for the pair, e.g. the histograms for each day of the week, and for arrival and departure time in the relevant periods. Thus, in this example, there would be standard histograms associated with the origin-destination pair in respect of these 14 profiles. The standard histograms will typically be different. Rather than storing the standard histogram itself in association with the origin-destination data, instead a reference code identifying the standard histogram is stored. Thus each standard histogram is allocated a reference code e.g. from 1-100 where there are 100 standard histograms. In addition, a total count for all journeys between the origin-destination pair, i.e. on all days of the week, and having either departure at the origin or arrival at the destination in the predetermined time periods, is stored for each origin-destination pair. This allows an approximate count for any time of interest to be derived from the standard profile which has been normalised with respect to the total count.

Figure 4:
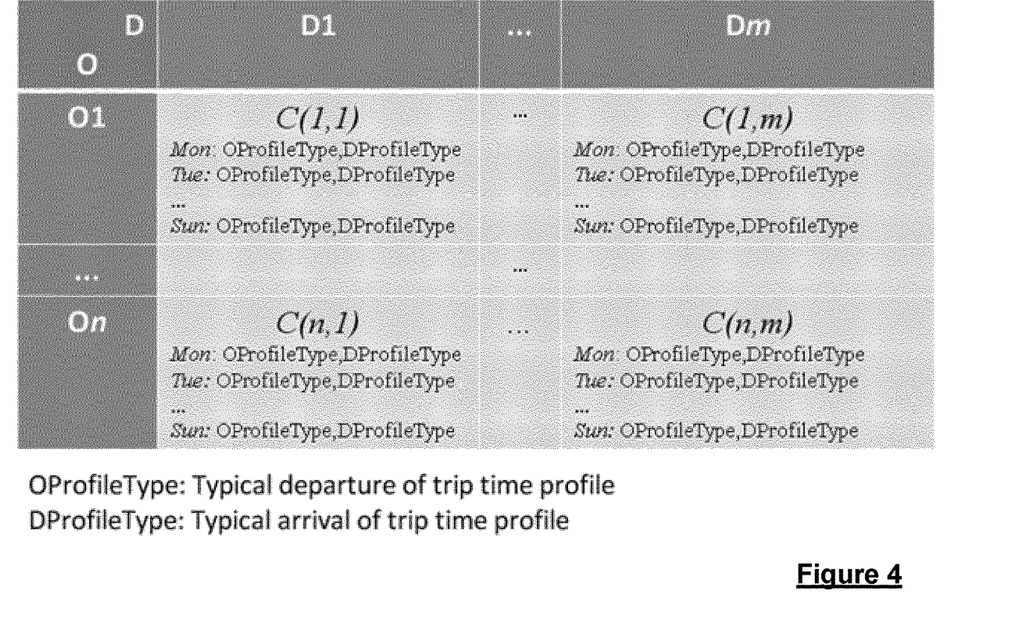
FIG. 4 is a generic example of a data product in accordance with an embodiment of the invention.

FIG. 4 illustrates the data that is stored in one embodiment. This is stored in an origin-destination matrix array. Here it can be seen that for each origin-destination pair (On,Dm) both an OProfileType and a DProfileType is stored for each day of the week. These are reference codes for the standard histogram representing the count of journeys with departure from the origin in the relevant time periods, and arrival at the destination in the relevant period. In addition, a total count, C(n,m) for that OD pair is stored, representing the total number of journeys between the origin and destination.

Figure 5:
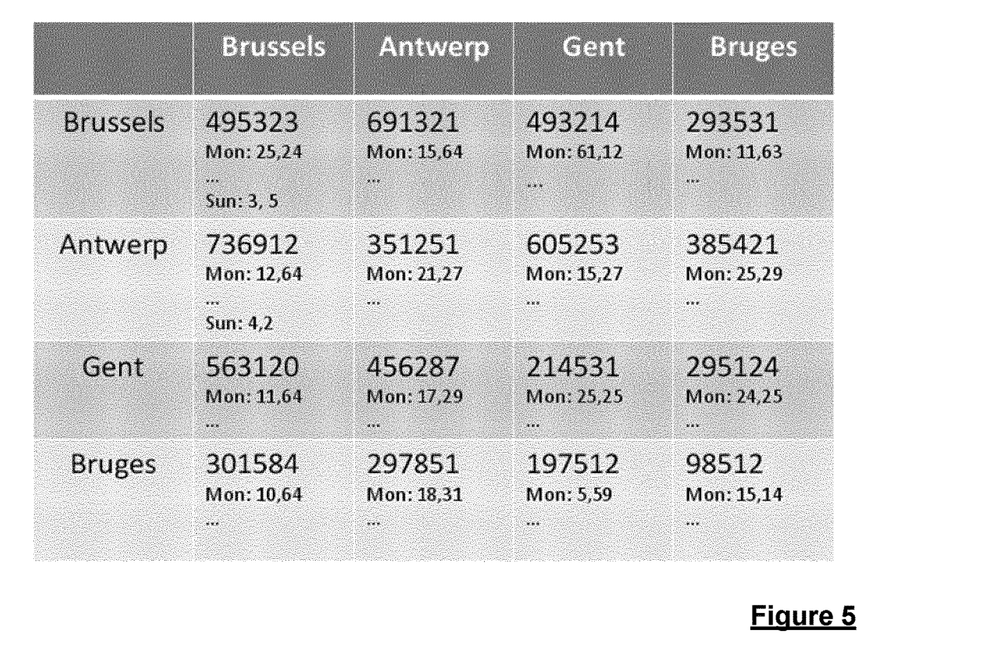
FIG. 5 is a specific example of a data product in accordance with an embodiment of the invention.

FIG. 5 illustrates an actual origin-destination matrix product in accordance with one embodiment, i.e. data product including such data for travel between locations Brussels, Antwerp, Ghent and Bruges. Looking at the trips made between Brussels and Antwerp, with Antwerp as destination along the top row, it may be seen that a total number of 691321 journeys were made. On Monday, the relevant standard profile, i.e. histogram describing the distribution of these journeys with respect to time of departure from Brussels, is profile number 15. The corresponding profile describing the distribution of journeys having arrival time at Antwerp within each predetermined period is profile number 64.

It can be seen that only a limited amount of data needs to be stored to capture this highly detailed time dependence of trips between the OD pairs, resulting in far greater efficiency of processing and data storage than would be required if a conventional multi-dimension OD matrix with a dimension for each time period as described above were used. The standard histograms may be stored separately, e.g. by a central controller or server system, with local devices effectively just storing the look up table type data as shown in FIGS. 4 and 5.

In this way, the present invention provides a low footprint product, which is easy to use. There is a high level of aggregation of profiles/histograms by use of the standard profiles addressing any privacy issues associated with the use of probe data.

In the example above, it will be appreciated that the counts recorded for each OD pair, and used to provide each profile may or may not count all probe vehicles travelling between the origin and destination in the relevant time periods. In one example, one or more intermediate locations may be defined between each OD pair. Probe data may be used to provide a profile for travel between the OD pair which represents the count of journeys for each of a plurality of time periods which is via the or each intermediate location. For example, it may be of interest to know the profile for travel between an OD pair via one particular town or using a particular road. In this situation, probe data may be filtered according to a further criterion, e.g. that it relates to travel between the origin and destination using a given road, and the resulting filtered data used to provide a profile for the OD pair relating to that particular route. This may be repeated for other possible routes between the OD pair by filtering out different data sets from the probe data. Each profile may be obtained as described above, other than that it is obtained using a set of probe data which does not necessarily correspond to all probe traces between the origin and destination. Similarly, different profiles may be obtained for the other sets of profiles as described, relating to travel between the OD pair, meeting the further criterion, for the other time periods, e.g. on other days of the week, for arrival/departure in the relevant periods, etc.

Such route dependent data may be used as the basis of the basic matrix product as shown in FIGS. 4 and 5, i.e. with the profiles determined and hence the standard profiles being determined using data filtered to correspond to journeys via a given route, or may, preferably be stored in addition to data which is based on all journeys, regardless of route, for each OD Pair. Thus a basic matrix product as shown in FIGS. 5 and 6 may be modified to incorporate route dependent data in respect of at least some OD pairs.

In the resulting matrix product of FIG. 4 or 5, this additional route dependent data may be stored in addition to data relating to the overall count of journeys between OD pairs by incorporating an additional dimension or dimensions in the matrix for those origin-destination pairs for which route dependent journey data is to be included. The number of additional dimensions for each OD pair would depend upon the number of possible routes between the pairs, or at least the number of routes of interest. Some OD pairs may not have more than one route between them for consideration, and may not incorporate any further dimension. Each further dimension stores the location information for a given intermediate location, and the relevant profile data for travel between the OD pair via that location, e.g. a reference to the standard profile representing the count in respect of the different time periods. There may be multiple standard profiles referenced as in the earlier embodiment, e.g. for different days of the week, departure/arrival time based profiles, etc. Thus, the profile data stored for each intermediate location may contain corresponding profile references as shown for each OD pair in FIG. 4 or FIG. 5, but which are specific to travel via that intermediate location.

Figure 6:
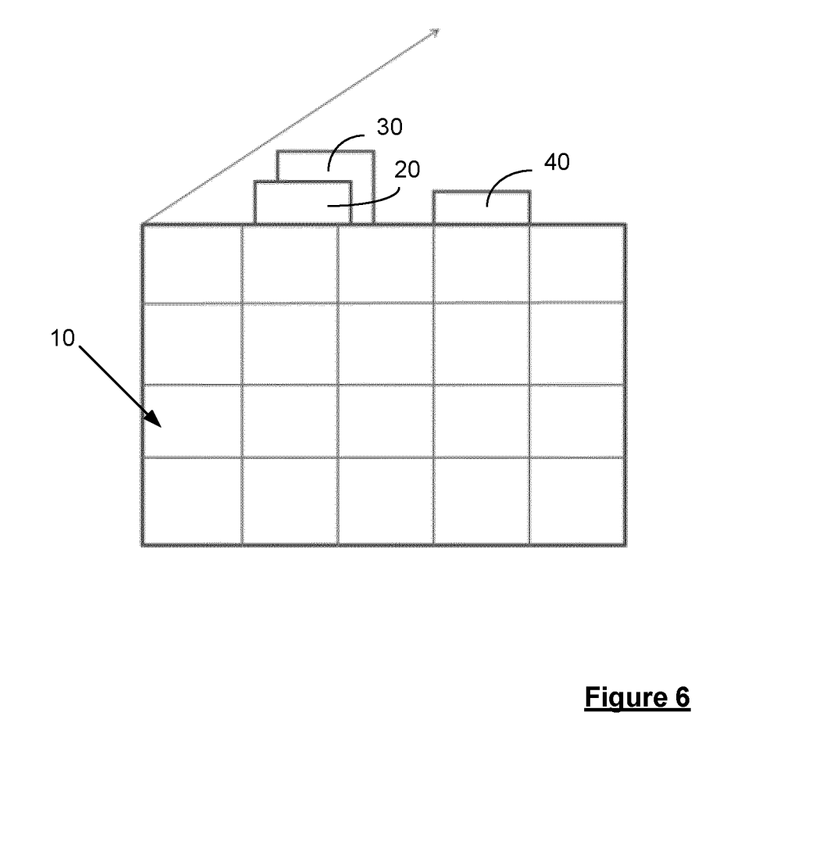
FIG. 6 illustrates the way in which route dependent data may be incorporated in a data product of the invention.

One exemplary matrix is shown in FIG. 6. This matrix includes a basic OD matrix 10 of the type shown in FIG. 4 or 5, containing profiles for travel between each OD pair on different days of the week, and considering departure and arrival time. However, additional data referring to corresponding profiles is contained for certain OD pairs, this time relating to the standard profiles describing counts of journeys between the OD pairs via a given intermediate location for each corresponding time period. For example, data entry 20 in a third dimension is in respect of travel between the OD pair (O1,D2) via intermediate location x. This includes an OProfileType and DProfileType for each day of the week as in the entries for the basic matrix. This OD pair includes a further corresponding data entry 30 in the third dimension for travel via intermediate location y. One other OD pair also includes a data entry 40 in the third dimension relating to travel via an intermediate point z between that origin and destination pair (O1,D4). The same process may be repeated for all OD pairs where route dependence is to be considered, and any number of dimensions may be added depending upon the route variations to be considered.

In these embodiments, rather than being considered OD pairs, it may be thought that there are instead N-grams, where N represents the number of locations including the origin and destination locations and any intermediate locations in each set of locations considered in the matrix. Thus, for one intermediate location, there would be a trigram, with N=3. In practice, the number of intermediate locations considered may depend upon the number of routes between OD pairs, or may be limited to more important routes, e.g. by functional road class. The intermediate locations may be points or zones, e.g. roads as with the origin and destination locations.

In any of the embodiments of the invention, the origin and destination locations may be chosen appropriately depending upon the intended use of the data product. For example, they may be real or virtual point or extended locations, e.g. zones. Examples include administrative areas, cities, virtual zones, e.g. according to geo-fencing boundaries or corresponding to digital map tiles or points thereon. Locations might be at city level, e.g. to model intercity travel by road, rail or otherwise, or at municipality level for modelling bus services. In other examples, locations could represent centroids or zones defined using demographic data, e.g. corresponding to zones of given population density. Roads may be represented by a location in the form of a box, polygon or point, e.g. based on a digital map.

The data product may be used in various contexts. One particular area of utility is in identifying sites, e.g. for buildings or shops. The location-based data provides a detailed breakdown of the number of journeys made between particular origins and destinations at different times, allowing interested parties to ascertain the optimum site for a given object.

The product may be used in general in geo-marketing, such as real estate and billboard placement applications, and also has use in relation to studies requiring journey distribution information. For example, the product may be used in traffic or mobility modelling to evaluate potential future changes, and predict the effect of changes in socio- or demographic conditions. In relation to transport planning, the demand for travel between different OD pairs, e.g. in the form of zones, may be studied, and the connectivity between zones considered. In these arrangements it may be particularly useful to take into account intermediate locations, in order to compare demand for different routes. The location-based data may be used in analysing traffic hot spots, in the study of the effect of possible change on an infrastructure, or, on a smaller scale, to the analysis of junctions. The invention is applicable to consideration of pedestrian movements, e.g. during urban planning, and to the movements of any type of vehicle, e.g. including trains, buses, boats, cars, lorries, etc. The routes between OD pairs may be railway lines, canals, bus routes, etc.

It will be appreciated that whilst various aspects and embodiments of the present invention have heretofore been described, the scope of the present invention is not limited to the particular arrangements set out herein and instead extends to encompass all arrangements, and modifications and alterations thereto. It should therefore be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of creating digital location-based data, the method comprising:
receiving positional data relating to the movement of a plurality of devices with respect to time in a geographical region;
filtering the positional data to obtain, for each of a plurality of origin-destination pairs in the geographic region, positional data relating to the travel of devices between the origin and destination;
analysing the filtered positional data to provide one or more sets of profiles, the or each set of profiles including a profile, in respect of each origin-destination pair, representing a count of journeys made between the origin and destination within each of a plurality of different predetermined time periods, wherein each profile of the or each set of profiles is a histogram;
using the or each set of profiles to generate a set of standard profiles, the generating comprising clustering the profiles in the or each set of profiles into separate profile groups, each separate profile group including profiles that are determined to be similarly shaped, and producing, for each separate profile group, a standard profile that approximates the shape of all the profiles in that separate profile group, wherein each standard profile is a histogram;
storing each profile of the set of standard profiles in a standard profile database;
identifying, for the or each profile from the one or more sets of profiles in respect of a given origin-destination pair, one of the set of standard profiles in the standard profile database which may be taken to represent the profile; and
storing digital location-based data, said location-based data comprising data indicative of the location of each origin-destination pair in association with a reference to the or each standard profile in the standard profile database identified as representing a profile in respect of the origin-destination pair, the reference to the or each standard profile being stored in the digital location-based data rather than the or each profile in respect of the origin-destination pair, and the digital location-based data being separate from the standard profile database.

2. The method of claim 1 wherein the positional data is obtained from devices associated with vehicles or pedestrians.

3. The method of claim 1 wherein the origin and destination of each origin-destination pair are locations in the form of zones.

4. The method of claim 1 wherein the standard profile is an average of the profiles in the group.

5. The method of claim 1 comprising identifying that a same given standard profile is to be taken to represent more than one profile from a given set of profiles, and/or, where multiple sets of profiles are provided, identifying that the same given standard profile is to be taken to represent profiles from different sets of profiles.

6. The method of claim 1 wherein the number of standard profiles in the set of standard profiles is less than the number of profiles used to obtain the set of standard profiles, and optionally less than the number of profiles in any one set of profiles used to obtain the set of standard profiles.

7. The method of claim 1 wherein the stored data indicative of the standard profile is a pointer which may be used to access the standard profile.

8. The method of claim 1 comprising, for one or more of the plurality of origin-destination pairs, defining one or more intermediate locations between the origin and destination locations, and filtering the positional data to obtain filtered positional data relating to travel between the origin and destination locations via the intermediate location or locations, wherein the step of analysing the filtered positional data provides one or more profiles for each of the one or more origin-destination pairs representing a count of journeys made between the origin and destination location via the intermediate location or locations within each of a plurality of different predetermined time periods.

9. The method of claim 8 further comprising storing data indicative of the location of the or each intermediate location in association with the data indicative of the location of the one or more origin-destination pairs.

10. The method of claim 1 wherein the or a given set of profiles includes, in respect of one or more of the origin-destination pairs, one or more profiles representing a count of journeys made between the origin and destination within each of the plurality of different predetermined time periods, and which journeys meet at least one additional criteria, optionally relating to a route taken between the origin and destination.

11. The method of claim 1 wherein the positional data is analysed to provide one or more of:
a set of profiles including a profile, for each origin-destination pair, representing a count of journeys made between the origin and destination within each of a plurality of predetermined time periods, and having a departure time from the origin within the respective predetermined time periods;
a set of profiles, including a profile, for each origin-destination pair, representing a count of journeys made between the origin and destination within each of a plurality of predetermined time periods, and having an arrival time at the destination within the respective predetermined time periods; and
a set of profiles including a profile, for each origin-destination pair, representing a count of journeys made between the origin and destination within each of a plurality of predetermined time periods for each of a plurality of different days of the week, and preferably for each day of the week.

12. The method of claim 1 wherein the standard profiles are normalised profiles, and the method further comprises, for each origin-destination pair, storing data in association with the data indicative of the location of the origin-destination pair, which data is indicative of a total count of journeys between the origin-destination pair represented by the one or more profiles in respect of the origin-destination pair.

13. A non-transitory computer readable medium comprising computer readable instructions that, when executed by one or more processors, cause the one or more processor to perform a method of creating digital location-based data, the method comprising:

receiving positional data relating to the movement of a plurality of devices with respect to time in a geographical region;

filtering the positional data to obtain, for each of a plurality of origin-destination pairs in the geographic region, positional data relating to the travel of devices between the origin and destination;

analysing the filtered positional data to provide one or more sets of profiles, the or each set of profiles including a profile, in respect of each origin-destination pair, representing a count of journeys made between the origin and destination within each of a plurality of different predetermined time periods, wherein each profile of the or each set of profiles is a histogram;

using the or each set of profiles to generate a set of standard profiles, the generating comprising clustering the profiles in the or each set of profiles into separate profile groups, each separate profile group including profiles that are determined to be similarly shaped, and producing, for each separate profile group, a standard profile that approximates the shape of all the profiles in that separate profile group, wherein each standard profile is a histogram;

storing each profile of the set of standard profiles in a standard profile database;

identifying, for the or each profile from the one or more sets of profiles in respect of a given origin-destination pair, one of the set of standard profiles in the standard profile database which may be taken to represent the profile; and storing digital location-based data, said location-based data comprising data indicative of the location of each origin-destination pair in association with a reference to the or each standard profile in the standard profile database identified as representing a profile in respect of the origin-destination pair, the reference to the or each standard profile being stored in the digital location-based data rather than the or each profile in respect of the origin-destination pair, and the digital location-based data being separate from the standard profile database.

* * * * *